United States Patent [19]

Béchet

[11] 4,397,033
[45] Aug. 2, 1983

[54] DEVICE FOR MEASURING CHARACTERISTIC PARAMETERS OF THE SPEED OF HANDWRITING

[75] Inventor: Louis Béchet, Douvaine, France

[73] Assignee: Battelle Memorial Institute, Carouge, Switzerland

[21] Appl. No.: 237,161

[22] PCT Filed: Jun. 10, 1980

[86] PCT No.: PCT/CH80/00069
§ 371 Date: Feb. 12, 1981
§ 102(e) Date: Feb. 9, 1981

[87] PCT Pub. No.: WO80/02883
PCT Pub. Date: Dec. 24, 1980

[30] Foreign Application Priority Data

Jun. 12, 1979 [CH] Switzerland .......................... 5474/79

[51] Int. Cl.³ .................. G06K 9/00; G08C 21/00; G01R 33/00
[52] U.S. Cl. .................................... 382/3; 178/19; 324/228; 382/64
[58] Field of Search ............... 340/146.3 SY; 178/18, 178/19, 20; 73/488, 506, 514, 518, 519, 432 A; 324/160, 173, 174, 179, 228, 207, 208; 382/3, 64

[56] References Cited

U.S. PATENT DOCUMENTS 4,273,954 6/1981 Takeuchi et al. ..................... 178/19

FOREIGN PATENT DOCUMENTS 2155878 5/1973 France .
2298082 8/1976 France .

OTHER PUBLICATIONS

Yoshida et al., "Input Pen Used for Electromagnetically Coupled Data Tablet", Trans. of the I.E.C.F., Japan, Section E, vol. E61, No. 7, Jul. 1978, pp. 561–562.
Stuckert, "Magnetic Pen and Tablet", IBM Tech. Disclosure Bulletin, vol. 22, No. 3, Aug., 1979, pp. 1245–1251.
Bechet, "Device for Measuring Characteristic Parameters of the Speed of Handwriting", International Publication #WO79/00363, Jun. 1979.

Primary Examiner—Leo H. Boudreau
Attorney, Agent, or Firm—Philip M. Dunson

[57] ABSTRACT

This device comprises two pairs of superimposed pick-up coils 1, 2, 5, 6. Each pair is formed by two windings coupled in series but with opposing winding directions, each winding of one pair having a layer of rectilinear conductive portions 1a, 2a, 5a, 6a side by side parallel to and superimposed on the similar portions of the other winding. These two windings extend on either side of their superimposed layers respectively. The superimposed layers of one pair of windings are orthogonal to those of the other pair.

This arrangement is intended to induce in each pair of coils, under the influence of a permanent magnet having a flux approximately perpendicular to these windings, fluxes which add up when the inductive flux varies in a plane parallel to the coils and which are cancelled when the inductive flux varies perpendicularly to this plane.

2 Claims, 4 Drawing Figures

DEVICE FOR MEASURING CHARACTERISTIC PARAMETERS OF THE SPEED OF HANDWRITING

TECHNICAL FIELD

The invention relates to a device for measuring characteristic parameters of the speed of handwriting based on electromotive forces induced by the writing instrument in pick-up coils.

STATE OF THE ART

Much work has already been carried out on the dynamic analysis of writing. Thus, the translation of the speed of writing into a proportional electrical signal has already been proposed. To achieve this object, it has been proposed, in particular, that the acceleration of the writing instrument be measured and the speed be deduced therefrom by integration of the measured acceleration. The presence of measuring elements on the writing instrument makes it necessary to connect the instrument to a data processing apparatus. This involves the presence of a wire, which is inconvenient. Moreover, accelerometers are sensitive to their orientation about the longitudinal axis of the writing instrument. This is why a solution in which the instrument is insensitive to its physical orientation is desirable.

It has already been proposed that this disadvantage be overcome by using a system of inductive pick-ups of the type described in PCT Application No. W079/00363. With this method of measurement, voltages are induced in two portions of crossed coils placed beneath the writing surface, by a permanent magnet placed in the pen.

Another problem inherent in this method of analysing writing involves the elimination of parasitic noise caused by displacements of the writing instrument which do not produce an outline, that is to say displacements which are communicated to this instrument when its writing point does not touch the writing substrate. Solutions utilizing systems of contacts have already been proposed as, for example, in U.S. Pat. No. 4,078,226. These systems are awkward as they have to be sensitive to slight pressures at any point on the writing substrate. It has also been proposed that the contact system be placed on the writing instrument, on the assumption that a source of current is coupled to the instrument or is connected thereto. Even in this case, the contact is a source of malfunctioning, not to mention the complication of the solution.

Moreover, U.S. Pat. No. 4,029,899 discloses a graphic detection device comprising a plurality of coils arranged alternatively in opposite directions to produce a signal when a magnetic flux passes from one coil to another, which is characteristic of the position of the writing instrument connected to the magnetic flux. Such a device is not therefore linked directly to the measurement of the dynamics of writing but, rather, is related to the graphical reproduction of the kinetics of the writing.

STATEMENT OF THE INVENTION

The object of the present invention is to overcome, at least in part, the disadvantages of the above-mentioned solutions.

For this purpose, the present invention relates to a device for measuring characteristics parameters of the speed of handwriting, characterised by the fact that it comprises, on the one hand, subjacent to the surface constituting the writing substrate, four superimposed windings of electrical conductors, coupled in series in pairs but with opposite winding directions, windings in the same pair containing two layers formed by rectilinear portions of conductors side by side, the rectilinear portions of conductors in one layer being parallel to and superimposed on the similar portions of the other layers, the remaining portions of the windings in this pair extending respectively on either side of their superimposed portions, the rectilinear portions of conductors of the layers in one pair of windings being orthogonal to those of the other pair, the zone of superimposition of these conductors defining the surface area of the said writing substrate and, on the other hand, a magnet adjacent to the writing point of the writing instrument of which the magnetization is selected so as to have a general orientation parallel to the longitudinal axis of the said instrument and symmetrical about this axis, all in such a way that, when the components of movement of this instrument are parallel to the plane of the said substrate, voltages are induced at the terminals of these pairs of windings as a function of the speed and direction of variation of the field relative to these rectilinear portions of conductors whereas the induced fluxes are cancelled in each pair of windings when the components of movement of this instrument are perpendicular to this plane.

BRIEF DESCRIPTION OF THE DRAWINGS

The attached drawings show schematically and by way of example an embodiment of the device forming the subject of the present invention.

BEST METHOD OF PERFORMING THE INVENTION

Figure 1:
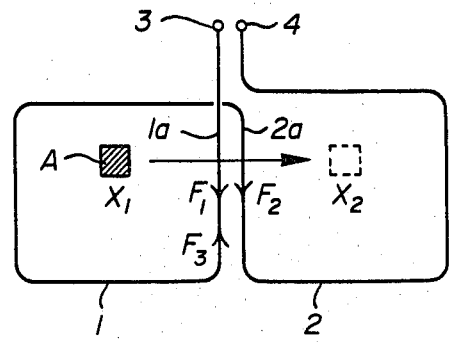
FIG. 1 is a plan view illustrating the winding principle of the coils of the measuring device.

The winding of electrically conductive wire illustrated in FIG. 1 has intentionally been simplified so as to show only one turn for each coil 1 and 2, these turns being coupled to each other in series while the two free ends of these same coils are connected to the terminals 3 and 4. The adjacent portions 1a and 2a of these coils are rectilinear and constitute two opposing sides of the respective turns so that these turns extend respectively on either side of their adjacent rectilinear portions. The pick-up zone of these coils is constituted by these rectilinear adjacent portions 1a and 2a of these coils.

This device is based on the induction of an electromotive force creating a potential difference at the terminals of the turns 1 and 2 subjected to a variation in the magnetic field of a magnet A of which the flux is approximately perpendicular to the plane of the turns 1 and 2. It has already been explained in PCT patent application No. CH78/00048 that the voltage at the terminals of a turn is directly proportional to the speed of variation of the field transversely to the portions 1a and 2a of these turns. In practice, the writing instrument has a cylindrical body and the permanent magnet is selected so that the general orientation of its magnetization is parallel to the longitudinal axis of this instrument and symmetrical about this axis.

In a closed circuit, it is known that the induced current produces a flux opposed to the variation in the inductive flux, therefore that the flux of the induced current is deducted from inductive flux if the latter increases and is added to it if it decreases. When the magnet A travels from the point $X_1$ to point $X_2$, the turn 1 experiences a decrease in inductive flux so that the induced current assumes the direction of the arrow $F_1$ while the turn 2 experiences an increase therein and the flux of the induced current is added to it, assuming the direction of the arrow $F_2$. It therefore follows that the currents in the coils 1 and 2 are added at the terminals 3 and 4.

Let us now assume that the magnet travels vertically relative to the plane of the coils 1 and 2 while approaching them, according to Maxwell's corkscrew rule, the induced current travels in the opposite direction to the movement of the corkscrew since the induction flux increases. The current will therefore assume the direction of the arrow $F_3$ in the turn 1 and of arrow $F_2$ in the turn 2. The currents are consequently cancelled in this case at the terminals 3 and 4.

This arrangement of the coils 1 and 2 in series but wound in two opposing directions thus permits a signal to be induced at the terminals 3 and 4 only in the case of displacements of the magnet A parallel to the plane of the surface of portions 1a and 2a.

Figure 2:
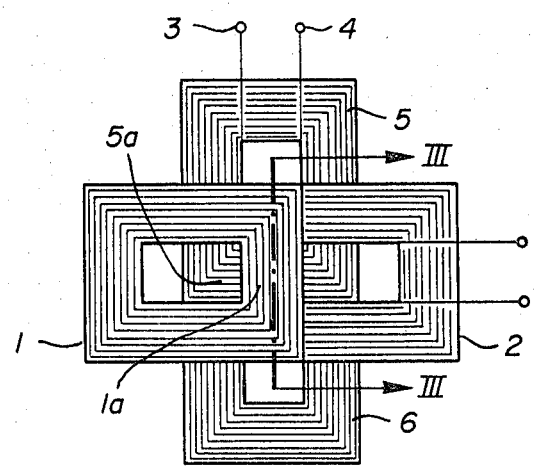
FIG. 2 is a plan view of the winding of this device.
Figure 3:
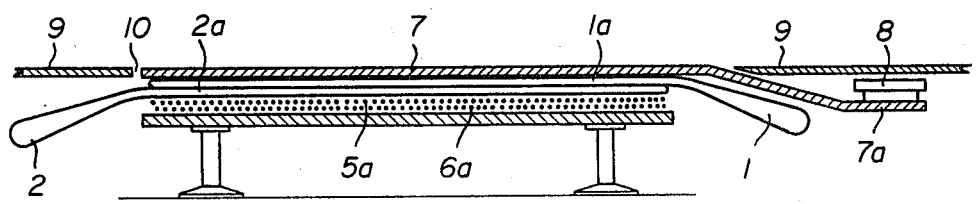
FIG. 3 is a sectional elevation of this device.

A second pair of coils 5 and 6 (FIG. 2) coupled as the coils 1 and 2 are arranged so that their layers of adjacent and parallel rectilinear portions of conductors 5a and 6a intersect the layers of the portions of conductors 1a and 2a at right angles. The zone where these four layers of portions of conductors 1a, 2a, 5a and 6a overlap will constitute the surface for detecting the speed of the magnet A integral with a writing instrument (not shown) in two orthogonal directions parallel to the planes of the layers of superimposed turns.

Although the arrangement of the coils 1, 2, 5 and 6, by eliminating the voltages induced by variations in magnetic field due to displacements of the magnet perpendicular to the planes of the layers of turns 1a, 2a, 5a and 6a, creates significant filtration, this does not eliminate the parasitic voltages induced by displacements of the magnet parallel to the writing surface. During the writing operation, a certain number of displacements parallel to the plane of writing are produced and generate a parasitic voltage at the terminals of the coils 1, 2 and 5, 6 without it being possible to detect the origin of this voltage during processing of the signal. This is why it is advisable to collect a second piece of information and to seek simultaneous conformity between the two pieces of information in order to process the signal relating to the voltage generated in the coils 1, 2, 5, 6.

For this purpose, a piezoelectric pick-up 8 constituted by a contact fixed to an extension 7a of the writing surface 7 subjacent to a support plate 9 which is coplanar with the writing surface and has an opening 10 to allow the passage of the writing surface integral with a support plate 11 between which are superimposed the four layers of portions of conductors 1a, 2a, 5a, 6a of the two respective pairs of coils. This assembly is provided to allow the piezoelectric pick-up 8 to record only the vibrations of the writing surface 7.

Figure 4:
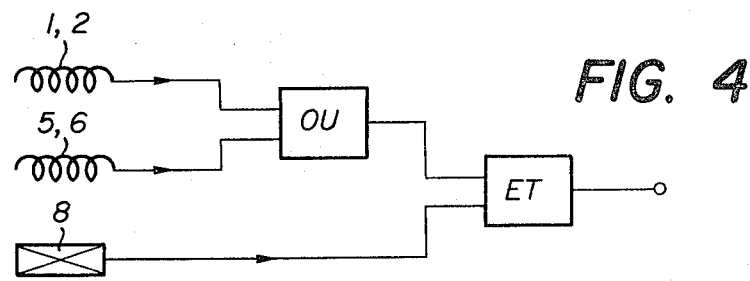
FIG. 4 shows an electrical diagram of the device.

It has been found by measurement that, depending on the nature of the writing point of the writing instrument and that of the writing surface, the frequency of the vibrations caused by the friction of the writing point on the writing surface is of the order of 100 to 300 Hz. Consequently, the signal processing circuit should be arranged in such a way that the voltages at the terminals of the coils 1, 2 and 5, 6 are analysed only if there is a simultaneous appearance of a frequency higher than 100 Hz. This data processing trigger circuit is illustrated in FIG. 4 which shows the coils 1, 2 and 5, 6 as well as the piezoelectric detector 8. The two pairs of coils are connected in parallel to an OR logic element whose output is connected, in parallel with the piezoelectric pick-up, to an AND logic element so that the processing of the signal issuing from the coils 1, 2 and 5, 6 begins only if two signals appear simultaneously at the input of the AND element.

Owing to this arrangement of coils and to the presence of the piezoelectric detector 8, the device described above permits the recording only of the voltages generated by the displacements of the writing instrument when its writing point touches the writing surface, without a contact member or other moving member.

Moreover, the arrangement of the coils 1, 2, 5 and 6 also permits elimination of the parasitic currents originating from any alternating current electrical apparatus operating in the vicinity of the device and creating noise which is added to the recorded signal. In fact, since the disturbing alternating electric field is the one whose lines of flux are perpendicular to the plane of the layers 1, 2, 5 and 6, the currents induced in each pair of coils 1, 2 and 5, 6 respectively are cancelled for the reasons explained above with reference to FIG. 1.

POSSIBILITY OF INDUSTRIAL EXPLOITATION

The device described above can be used industrially, in particular, for comparing the outline of a signature written by an unknown person with the speed parameters of a specimen signature of a person of known identity.

I claim:

1. Apparatus for measuring characteristic parameter of the speed of handwriting in a predetermined writing area on a writing support surface, comprising
    a writing instrument having therein a longitudinal axis, a writing point at one end thereof, and means for providing a magnetic flux directed substantially parallel and adjacent to the axis; and
    subjacent to the writing support surface, four superimposed windings of electrical conductors divided into two pairs of windings, the two windings of each pair being connected in series but with opposing winding directions, the windings of the same pair comprising two layers formed by rectilinear portions of conductors side by side, the rectilinear portions of conductors of one layer being parallel to and superimposed on the similar portions of the other layer, and having remaining portions of the windings of each pair extending respectively on either side of the superimposed portions thereof, the rectilinear portions of conductors of the layers of one pair of windings being orthogonal to those of the other pair, the zone of superimposition of the conductors defining the predetermined writing area of the writing support surface, arranged so that, when the components of movement of the writing instrument are parallel to the plane of the support surface, voltages are induced at the terminals of the pairs of windings as a function of the speed and the direction of variation of the magnetic flux relative to the rectilinear portions of the conductors, whereas the induced voltages are cancelled in each pair of windings when the components of movement of the writing instrument are perpendicular to the plane of the support surface.

2. Apparatus as in claim 1, wherein the two pairs of windings are connected in parallel to an OR logic element whose output is connected, in parallel with a piezoelectric detector coupled to the writing support surface, to an AND logic element.

* * * * *